United States Patent
Kelly

(10) Patent No.: US 10,070,286 B2
(45) Date of Patent: Sep. 4, 2018

(54) SINGLE-WIRE SENSOR BUS

(71) Applicant: Analog Devices, Inc., Norwood, MA (US)

(72) Inventor: Thomas W. Kelly, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/166,969

(22) Filed: May 27, 2016

(65) Prior Publication Data

US 2018/0041874 A1    Feb. 8, 2018

(51) Int. Cl.
*H04W 4/38* (2018.01)
*H04B 5/00* (2006.01)
*H04W 84/18* (2009.01)

(52) U.S. Cl.
CPC ............ *H04W 4/38* (2018.02); *H04B 5/0031* (2013.01); *H04B 5/0037* (2013.01); *H04W 84/18* (2013.01)

(58) Field of Classification Search
CPC ........................ H04W 84/18; H04B 5/00–5/02
See application file for complete search history.

(56) References Cited

U.S. PATENT DOCUMENTS

| | | | |
|---|---|---|---|
| 7,081,693 B2 | 7/2006 | Hamel et al. | |
| 7,549,327 B2 | 6/2009 | Breed | |
| 2007/0096889 A1* | 5/2007 | Alrabady | B60C 23/0408 340/447 |
| 2007/0096890 A1* | 5/2007 | Talty | B60C 23/0408 340/447 |
| 2007/0173214 A1* | 7/2007 | Mickle | H02J 17/00 455/127.1 |
| 2009/0102296 A1 | 4/2009 | Greene et al. | |
| 2011/0125428 A1 | 5/2011 | Heer et al. | |
| 2012/0123649 A1* | 5/2012 | Eggers | B60R 13/07 701/49 |
| 2013/0342326 A1* | 12/2013 | Wang | H04Q 9/00 340/10.1 |
| 2015/0012184 A1 | 1/2015 | Weinberg | |
| 2016/0261151 A1* | 9/2016 | Kim | H02J 7/025 |
| 2016/0280069 A1* | 9/2016 | Laute | H02J 50/10 |

FOREIGN PATENT DOCUMENTS

| | | |
|---|---|---|
| DE | 102010062584 A1 | 6/2012 |
| KR | 10-1203735 B1 | 11/2012 |
| KR | 10-2014-0085199 A | 7/2014 |

(Continued)

OTHER PUBLICATIONS

Batlle, "RF energy harvester based on MEMS," Universitat Autònomade Barcelona, 7 pages, Sep. 9, 2010.

(Continued)

*Primary Examiner* — Gennadiy Tsvey
(74) *Attorney, Agent, or Firm* — Wolf, Greenfield & Sacks, P.C.

(57) ABSTRACT

A electronics control unit is in contemporaneous wireless power communication and wireless data communication with a network of sealed, sensors over a shared bidirectional power antenna. Sensors and sensor networks described below enable the development of networks that are secure and robust, and yet are lighter-weight and lower-cost than, for example, conventional automotive sensor networks.

16 Claims, 7 Drawing Sheets

(56) References Cited

FOREIGN PATENT DOCUMENTS

KR         101530491 B1    6/2015
WO    WO 2013/068739 A2   5/2013

OTHER PUBLICATIONS

Le et al., "Efficient Far-Field Radio Frequency Energy Harvesting for Passively Powered Sensor Networks," IEEE Journal of Solid-State Circuits, vol. 43, No. 5, pp. 1287-1302, May 2008.
Impinj, Inc., "RFID Technology Primer," www.impinj.com ; circa 2015, 19 pages.
Shams et al., "Wireless Power Transmission to a Buried Sensor in Concrete," IEEE Sensors Journal, vol. 7, No. 12, pp. 1573-1577, Dec. 2007.
Tomar et al., "Wireless Power Transmission: Applications and Components," International Journal of Engineering Research & Technology, ISSN: 2278-0181, vol. 1, Issue 5, Jul. 2012.
YAMAR Electronics Ltd., "SIG60-UART over Powerline, for AC/DC Multiplex Network," YAMAR Electronics Ltd. Preliminary Data Sheet, 16 pages, 2010.
Young, "An RF-Powered Wireless Multi-Channel Implantable Bio-Sensing Microsystem," $32^{nd}$ Annual International Conference of the IEEE EMBS, pp. 6413-6416, 8 pages, Aug. 31-Sep. 4, 2010.
Gao, Hao, "Small Temperature Sensor Using mm-wave data and power transfer," RF Technology Days, 18 pages, Apr. 2, 2014.
International Search Report and Written Opinion dated Sep. 6, 2017 in connection with International Application No. PCT/US2017/034627.

\* cited by examiner

SINGLE-WIRE SENSOR BUS

TECHNICAL FIELD

The present disclosure relates to sensors, and more particularly to communications with sensors.

BACKGROUND ART

The automotive industry employs a variety of sensors in motor vehicles, including accelerometers and gyroscopes for providing vehicle motion information to safety systems such as stability control systems and air-bag systems, to name but a few examples. A wired network provides power to the sensor, and carries signals from the sensors to an electronic control unit, which processes signals from the sensors and sends control signals to safety systems. Such wired systems impose weight costs and materials costs, and impose complexity to the motor vehicles and their manufacture. For example, version 2.1 of the technical specification of the Peripheral Sensor Interface 5 interface, published in 2012 ("PSI5") defines a two-wire current interface that requires a two-wire bus to run to each of the sensors within a motor vehicle. Each sensor must include a connector to interface to a counterpart connector on the PSI5 interface two-wire bus. Such connectors add weight and cost, and also introduce a risk of dust or moisture entering the sensor and/or bus at the physical interface between connectors.

SUMMARY OF THE EMBODIMENTS

A first embodiment describes a network system including an antenna (which may be a single-wire antenna, for example), and a communications interface electrically coupled to the single-wire antenna, the communications interface configured to send and receive data signals via the single-wire power antenna. This embodiment also includes a power transmitter electrically coupled to the single-wire antenna, and configured to produce a power signal on the single-wire antenna. The communications interface and the power transmitter both use the single-wire antenna to contemporaneously engage in data communication and power communication with at least one load.

In some embodiments, the load includes at least one a sealed sensor module in wireless power communication with the power transmitter, and in wireless data communication with the communications interface, via the single-wire antenna. In various embodiments, the at least one sealed sensor module includes a plurality of distinct sealed sensor modules, each of the plurality of sealed sensor modules in wireless power communication with the power transmitter, and in wireless data communication with the communications interface, via the single-wire antenna. For example, in various embodiments a sealed sensor module may be a gyroscope or an accelerometer.

In addition, in various embodiments, the sensor module is a battery-less sealed sensor module, and in some embodiments, the sensor module includes a power storage element, such as a capacitor for example.

In some embodiments, the power transmitter is configured to intermittently transmit power signals so as to provide continuous power to the at least one a sealed sensor module. For example, the power transmitter may be configured to transmit bursts of magnetic or electromagnetic (e.g., radio frequency) energy.

Some embodiments of network systems may be disposed in a motor vehicle having at least one safety system. In such embodiments, the communications interface and the power transmitter be form, or be part of, an electronics control unit that controls the at least one safety system.

In some embodiments, the antenna has an unterminated end distal from the power transmitter; and the power signal is an RF signal. In other embodiments, the antenna forms a loop with the power transmitter, and the power signal comprises current pulses.

In another embodiment, a motor vehicle sensor system includes a motor vehicle having a dual-mode antenna (which may be a single-wire bidirectional power antenna, for example) with an antenna node. The motor vehicle also includes an electronics control unit having a communications interface electrically coupled to the dual-mode antenna at the antenna node, and configured to send and receive data signals via the single-wire power antenna. In addition, the electronics control unit includes a power transmitter electrically coupled to the dual-mode antenna at the antenna node, and configured to produce a power signal on the single-wire power antenna. In this configuration, the electronics control unit is configured to transmit both the data signals and the power signal on the single-wire bidirectional power antenna, to at least one a sensor module in power communication with the power source, and in data communication with the communications interface, via the single-wire bidirectional power antenna.

In some embodiments, the at least one sensor module is a sealed sensor module comprising an accelerometer, or a gyroscope. In some embodiments, the at least one sensor module is a battery-less sensor module.

In some embodiments, the motor vehicle further includes at least one safety system under control of the electronics control unit.

An embodiment of a method of operating a network system includes providing an antenna; and receiving wireless data signals from a sensor via the antenna; as well as providing continuous power to the sensor by transmitting a power signal to the sensor via the antenna. Some embodiments also include sending wireless data signals to the sensor via the antenna. In some embodiments, the sensor is a battery-less sensor.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In illustrative embodiments, sensors and sensor networks allow the development of networks, such as motor vehicle sensor networks for example, that are secure and robust, and yet are lighter-weight and lower-cost than, for example, conventional automotive sensor networks. Various embodiments include environmentally-sealed sensors, which are small and light-weight because they do not contain batteries, or electrical connectors that would allow entry into the sensors of dust or moisture from the environment. Instead, power to each sensor is provided via a nearby conductor over a wireless power interface, and communications to and from the sensor are provided from the same conductor via a wireless communications interface.

Figure 1A:
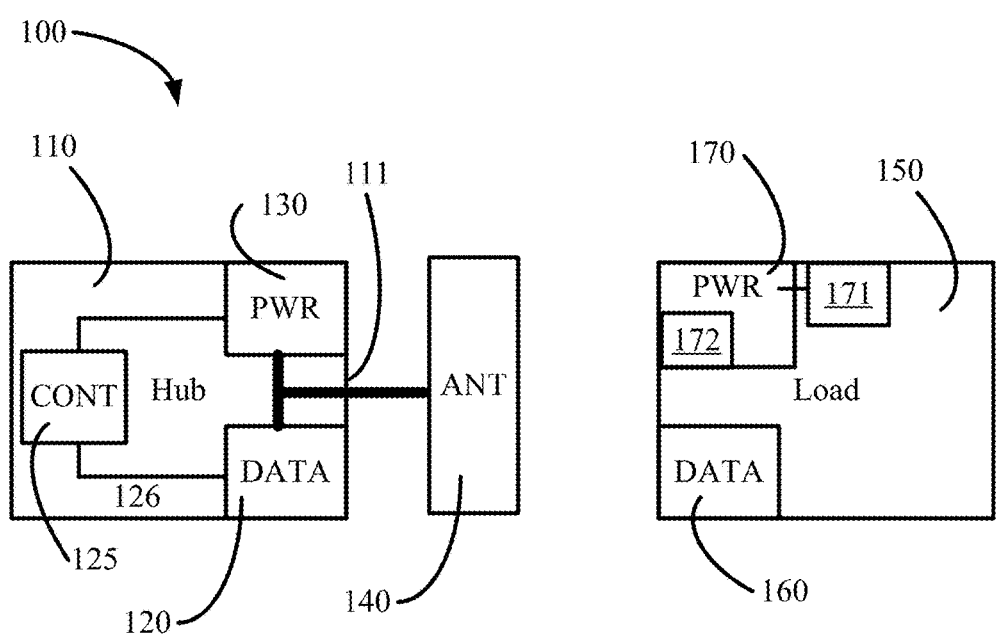
FIG. 1A schematically illustrates a network according to a first embodiment.

FIG. 1A schematically illustrates a network 100 according to a first embodiment. The network 100 includes a data communications interface 120 and a power transmitter 130, both configured to wirelessly communicate with one or more loads 150. More specifically, the data communications interface 120 is configured to be in wireless data communication with a corresponding data communications module 160 in at least one load 150, and the power transmitter 130 is configured to be in wireless power communication with a power reception module 170 in load 150.

The system 100 also includes a conductor 140, which in some embodiments may be described as a bidirectional power antenna, or may be described as a dual mode antenna. The conductor 140 is bidirectional in that it is configured to wirelessly communicate data signals both to and from at least one remote wireless load 150. The conductor 140 is a power antenna in that it is configured to wirelessly transmit power signals to the at least one remote wireless load 150. An antenna may be a single-wire, and/or may be unterminated (see, e.g., antenna 141 in FIG. 4) or may form a loop (see, e.g., antenna 541 in FIG. 5). An antenna may be a single wire (e.g., that carries both power signals and data signals) even though the single wire may be bundled with other wires in a bus, for example. The conductor 140 is dual mode in that the same conductor carries both wireless power transmission and wireless data communication. In the embodiments described herein, the terms "wireless" and "wirelessly" mean that the data and power do not travel to and/or from a load 150 via a wired or physical connection between conductor 140 and the load 150.

In the embodiment of FIG. 1A, the data communications interface 120 and the power transmitter 130 are both part of a hub 110 (e.g., an ECU in a motor vehicle), but that is not a limitation of the system. Indeed, the data communications interface 120 and the power transmitter 130 may be disposed at different locations, e.g., within a vehicle, and/or may be coupled to different locations along the conductor 140 (e.g., distal locations 191 and 192 as schematically illustrated in FIG. 1C). This may reduce total wiring (and weight and expense), and/or allow flexibility in weight distribution, in a motor vehicle, for example, by allowing power to be supplied to the conductor 140 at a source of power storage or generation (e.g., a motor vehicle battery or alternator), while allowing data to be supplied to, and/or received from, the conductor 140 at a source of data communications (e.g., an ECU in a motor vehicle). Therefore, it is not necessary that the data communications interface 120 and the power transmitter 130 be in the same place or in a hub 110, and indeed it may be desirable to have them in distant locations from one another.

The hub 110 in the embodiment of FIG. 1A includes the data communications interface 120, which is configured to transmit and/or receive data communications via conductor 140. In various embodiments, the data communications interface 120 may wirelessly transmit data to, and/or wirelessly receive data from, one or more loads 150 (e.g. using conductor 140 as an antenna), and is may therefore be described as being in wireless data communication with such loads 150.

Figure 2A:
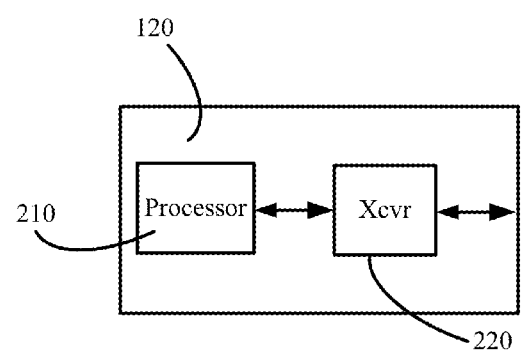
FIG. 2A schematically illustrates an embodiment of a data communications interface.

An embodiment of a data communications interface 120 is schematically illustrated in FIG. 2A, and contains a data source such as processor 210, which may include a memory, and a data transceiver 220.

The data source 210 may be a processor, such as a computer processor or digital signal processor, for example, or may be an application specific integrated circuit, to name but a few examples. Indeed, in some embodiments, the data source 210 may be a controller 125. The data source 210 provides data to, and receives data from, load 150 via the data transceiver 220. The data transceiver 220 is coupled to the conductor 140, at node 111, to allow the data transceiver 220 to dispose data signals onto the conductor 140, and receive data signals from the conductor 140.

In various embodiments, data may be transmitted via conductor 140 in a variety of ways. The data transceiver 220 in some embodiments modulates data onto the conductor 140 at high frequencies (e.g., RF frequencies) so that the conductor 140 behaves as an antenna to transmit the data to a load wirelessly as a propagating electromagnetic signal, to be received by the load 150 using an antenna for example. In other embodiments, the data transceiver 220 modulates data onto the conductor to implement a near-field magnetic induction communication system, whereby the data is transmitted from the conductor 140 to a load wirelessly via a magnetic field, to be received by the load using a magnetometer or Hall Effect sensor, to name but a few examples.

In addition, in various embodiments data may be modulated using amplitude modulation, frequency modulation, or phase modulation, with any of the foregoing transmission methods.

Figure 2B:
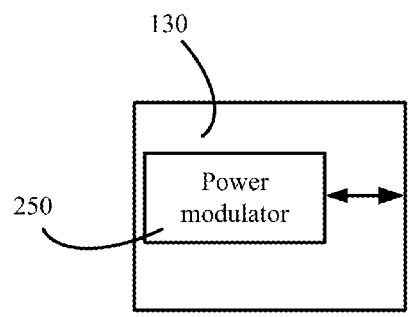
FIG. 2B schematically illustrates an embodiment of a power controller.
Figures 3A, 3B, 3C:
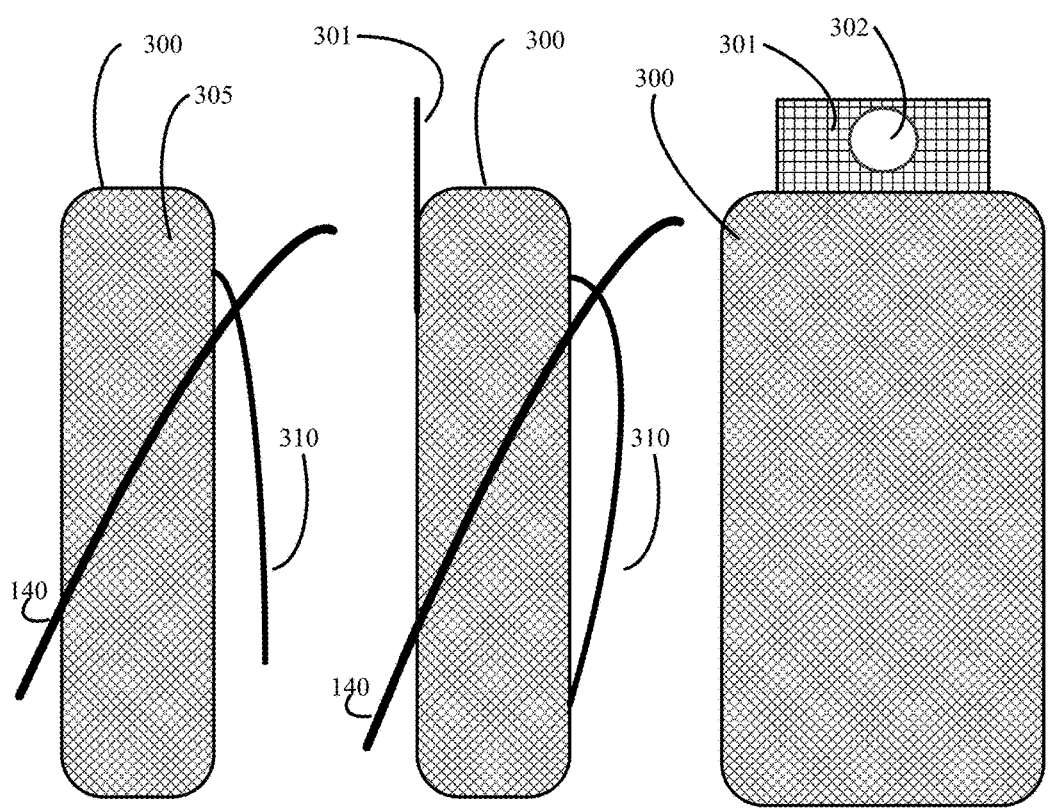
FIGS. 3A-3D schematically illustrate embodiments of a load.
Figure 3D:
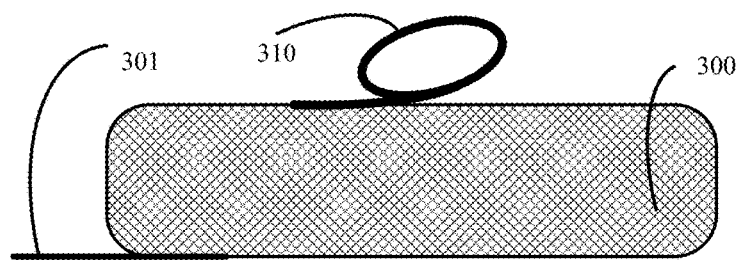

The power transmitter 130 is configured to transmit power to load 150 via the same conductor (140) that carries data to/from the data communications interface 120. An embodiment of a power transmitter 130 is schematically illustrated in FIG. 2B, and contains a power modulator 250 configured to place a power signal onto conductor 140. In various embodiments, the power transmitter 130 may wirelessly transmit power to one or more loads (150), and may therefore be described as being in wireless power communication with such loads 150. In various embodiments, the power signal may be an AC signal, unlike for example DC power supplied by a typical automotive battery.

In operation, the data communications interface 120 and the power transmitter 130 share the conductor 140 to be in contemporaneous data communication and power communication with one or more loads 150. In some embodiments, the data communications interface 120 and the power transmitter 130 intermesh their operations in time, as schematically illustrated in the timing diagram 180 of FIG. 1B, for example, and in some embodiments, the data communications interface 120 and the power transmitter 130 intermesh their operations in frequency, as schematically illustrated in FIG. 1C. In some embodiments, data may be modulated onto a power signal, so that a single signal may serve as both power signal and data signal, in some embodiments power signals and data signals are distinct from one another.

In time-interleaved embodiments, the power transmitter 130 may deliver a power signal to the conductor 140 during a first limited period of time (e.g., 181A, which may be described as a "power burst"), and then refrain from delivering a power signal to the conductor 140. Similarly, the data communications interface 120 may deliver a data signal to, or receive a data signal from, the conductor 140 at a different limited period of time (182A, which may be described as a "data burst") which period of time does not overlap in time with a power burst. Optionally, there may be a time (e.g., time 183) in-between power bursts and data bursts. In some embodiments, the timing of the power bursts and/or the timing of the data bursts; and/or the gaps 183 between them, may synchronize communications with one or more loads 150 in the system, or from one or more loads 150 to data communications interface 120. For example, a given load 150 may take control of (e.g., transmit on, to the exclusion of other loads and the data communications interface 120) conductor during every data period (e.g., 182A, 182B) (for example after the end of each other power burst, e.g., 181A, 181B), every other data period (e.g., 182B) (for example after the end of every other power burst), or every third data period, or every Nth data period (where N is an integer).

In some embodiments, such time intermeshed transmission of power and data may be controlled by a controller 125, which may be a programmed microprocessor, digital signal processor, microcontroller, ASIC, a state machine (e.g., cycling control signal 126 between 0 and 1), or a clock. In operation, the controller 125 controls the access to the conductor 140 by the data communications interface 120 and the power transmitter 130. For example, the controller 125 may enable access to the conductor 140 by the data communications interface 120, and disable access to the conductor 140 by the power transmitter 130, when signal 126 is a logic one, and enable access to the conductor 140 by the power transmitter 130 and disable access to the conductor 140 by the data communications interface 120 when signal 126 is a logic zero.

In other embodiments, a power signal from the power transmitter 130 and a data signal to or from the data communications interface 120 may both use the conductor 140 simultaneously, or at overlapping times. For example, a data signal to or from the data communications interface 120 may be frequency division multiplexed (FDM) on the conductor 140 with a power signal from the power transmitter 130 (e.g., FIG. 1C). In various embodiments, the data signal and power signal may be different signals, distinguishable from one another, for example because they are on the antenna at different times, or have different frequencies. In these ways, a power receiver at a load 150 (e.g., a sensor) is able to distinguish between a power signal and a data signal, and a data receiver at the load is able to distinguish between a data signal and a power signal, such that the data signal and power signal do not interfere with each other, or the operations of the load (150).

In various embodiments, power may be transmitted via conductor 140 in a variety of ways. The power transmitter 130 in some embodiments deposits or induces onto the conductor 140 a high frequency (e.g., radio frequency) AC signal during a power burst (e.g., 181A; 181B). The AC signal may be received by a power reception module 170 at a load 150 by an antenna or rectenna, for example. In some embodiments, the power transmitter 130 deposits or induces onto the conductor 140 an electrical current during a power burst (e.g., 181A; 181B). The electrical current may wirelessly transmit power to a load 150 by inducing a corresponding current in a coil at a power reception module 170 of the load 150.

In some embodiments, the delivery of power to one or more loads 150 provides continuous power to the one or more loads 150. This may be important, for example, for sensors in automotive safety systems (e.g., stability control systems and air-bag systems), in which the sensors (e.g., accelerometer crash sensors; stability control gyroscopes) operate continuously when the car is in operation, not only when queried by an electronics control unit. The term "continuous power" (or "continuous operating power") means power that is supplied to a load 150 sufficiently (e.g., in frequency and amount) to ensure that the load 150 has uninterrupted power sufficient to allow the load 150 to perform its intended function without power interruption.

Providing continuous power (continuous operating power) does not require that a power signal itself be continuous (uninterrupted in time), although the power signal may, in some embodiments, be continuous. In some embodiments, a power signal may be continuous, but at a different frequency than a data signal, so that a power signal and one or more data signals can be simultaneously be on a single-wire antenna. In such embodiments, the power signal and one or more data signals may be at frequencies that are not harmonically related (i.e., if their frequencies are not harmonics of one another). For example, as schematically illustrated by spectrum 186 in FIG. 1C, a power signal 187 may be at 200 KHz, while one data signal 188 may be at 300 KHz, and optionally another data signal 189 may be at 500 kHz. In this way, the power transmitter 130 may provide continuous power via an uninterrupted (in time) power signal to a load (e.g., a sensor module).

In some embodiments, the signals 188 and 189 may represent a frequency shift keying (FSK) signal at two different times. As known in the art, in a frequency shift keying signal a data signal is modulated to be one frequency (e.g., in this example, 500 KHz) to represent a digital one, and a different frequency (e.g., in this example, 300 KHz) to represent a digital zero.

Some embodiments supply continuous power to a load even though the transmission of power to the load may be intermittent or non-continuous. For example, the components of a load (e.g., sensor, transmitter, actuator, etc.) may consume power at a rate sufficiently low that power received during a power burst (e.g., 181A; 181B) is sufficient to keep the components operating at all times between bursts. The power delivered is more than is required merely for the sensor to respond to a query from the hub.

As another example, in embodiment in which a load 150 has a power storage element 171 (e.g., a capacitor) to store wirelessly transmitted power that it has received, "continuous power" supplied to a load 150 may be supplied intermittently, as long as the total power supplied is, in cooperation with the load's power storage element, sufficient to supply sufficient power to the load so that the load can perform its intended function without temporal interruption. The sufficiency of power delivered to a load 150 may depend on the nature and power consumption of the load, its use and operating environment, and thus may vary from one system to another, but is such that it may be determined by a system's designer or operator.

The network 100 includes at least one load 150, and may include any number of loads 150. A load 150 may include any of a variety of devices, such as sensors (e.g., sensor module 400 described below) or actuators to name but a few examples. Examples of sensors include, but are not limited to, accelerometers, gyroscopes, microphones, and pressure sensors. Examples of actuators include, but are not limited to, speakers and buzzers for example.

The load 150 includes a power reception module 170 to receive wirelessly, and optionally to store power received wirelessly, from conductor 140. In various embodiments, power reception module 170 has a power reception element 172, which may be a coil onto which is wirelessly induced a current from the conductor 140, or a rectenna to receive power wirelessly from conductor 140, to name but a few examples. Some embodiments include a power storage element 171 to store power received wirelessly from conductor 140. For example, the power storage element 171 may be a capacitor. In some embodiments, the load 150 does not have a battery (i.e., it is battery-less), and receives all of its operating power wirelessly from conductor 140.

The load 150 also includes a data communications module 160 to wirelessly receive data from the conductor 140, and/or to wirelessly transmit data on conductor 140 (e.g., data from/to data communications interface 120).

In operation, data communications module 160 may receive data to control elements of the load. For example, incoming data received by data communications module 160 may cause a sensor within the load to execute a self-test, or may cause the load to go into a low power mode, or to awaken from a low power mode, to name but a few examples. If the load 150 is an actuator, data received by data communications module 160 may control the actuator to perform an action, such as making a sound or executing a movement, for example.

Data transmitted by the data communications module 160 (i.e., outgoing data) may include data produced by a sensor, such as acceleration data produced by an accelerometer, or rotation data produces by a gyroscope, to name but a few examples. Transmitted data may also include status information about the load, such as the results of a self-test, reporting a malfunction, or its power state (e.g., low power state; operational power state; etc.).

As illustrated by the foregoing examples, the data sent and/or received by a load 150 may be dynamic, in that the data is not necessarily the same over time. For example, if the load 150 includes an accelerometer mounted in a moving automobile, data transmitted by the load may include, among other things, data representing acceleration sensed by the accelerometer at the moment of transmission, which data naturally changes continuously as the automobile moves.

In addition, incoming data received wirelessly by the load 150 from conductor 140, and outgoing data sent wirelessly from the load 150 to conductor 140, may include signals relating to implementation of a communication's protocol.

An embodiment of a packaged load 300 is schematically illustrated in FIGS. 3A-3D. In some embodiments, the load 300 may be a sensor, as described further below. In some embodiments, the load 300 may be an actuator, such as a speaker or buzzer, to name but a few examples.

The body 305 (or "shell") of the packaged load 300 may be, for example, an encapsulant molded around the internal components in ways known in the art for packaging integrated circuits, or may be a two-part (or more) package in which internal components are enclosed and sealed.

In some embodiments, the load 300 may be environmentally sealed (for example, in some embodiments, the environmental seal is configured to meet or exceed the IP67 standard). In some embodiments, a sealed load 300 does not have a wired communications interface to carry communications signals into or out of the sealed load 300. Similarly, the sealed load 300 does not have a wired power interface to power the sensor or the wireless data communications interface. The wireless power interface is not a transducer that harvests energy from motion, and is not a mechanical transducer. A sealed load 300 may optionally have on-board power storage 171 (such as a capacitor, for example) electrically coupled to the wireless power interface 170 and configured to store energy received via the wireless power interface. In some embodiments, a sealed load 300 does not have a battery.

In some embodiments, the sealed load 300 may have a structure for securing the sealed sensor to another device, such as a motor vehicle for example. For example, sealed load 300 in FIGS. 3A-3C may have a tab 301 with an aperture 302. A fastener, such as a screw or bolt, for example, passes through aperture 302 to secure the sealed load 300 to the other device. As another example, some embodiments include a clip 310, which may be open ended as in FIG. 3A, or a closed loop formed partly by the load as in FIG. 3B, or a loop attached to the load as in FIG. 3D. The clip 310 may secure the sealed load 300 by coupling to a corresponding clip, or aperture, in the device to which the sensor is secured.

In some embodiments, a clip 310 may secure a conductor 140 (which may be antenna 141 or antenna 541, for example) to the sealed load 300. For example, in some embodiments, a clip 310 holds a conductor 140 within 2 centimeters or 3 centimeters of the sealed load 300. Such a clip 310 may hold the conductor 140 stationary with regard to the sealed load 300, so that the sealed load 300 does not move relative to the conductor 140. In this way, the sealed load may be held close to the conductor 140 so as to facilitate power communication and data communication between the conductor 140 and the sealed load 300, such that motion causing a gap between the conductor 140 and the sealed load 300 might reduce the fidelity or efficiency of transmission of those signals between the conductor 140 and sealed load 300.

Such embodiments may provide potential benefits. For example, keeping the conductor 140 in close proximity to the load 300 also means that the distance a data signal must cross from the conductor 140 to the sealed load 300, and from the sealed load 300 to the conductor 140, is small and well-defined. Consequently, in some embodiments, the power of such data signals is small; and may be large enough only to cross such short distances, without spreading power a greater distance than necessary. For example, the power needed would be much smaller than the signal power needed to send and/or receive power between a sensor and transceiver located near the center of a vehicle. Such embodiments may provide increased data security, as compared to systems that have greater distances between a sensor and a transceiver, because the signal power transmitted from an antenna need not travel so far, and the antenna in load 300 need not be sensitive enough to faithfully receive signals from greater distances. Such embodiments also stand to release less RF energy into the host vehicle, thereby mitigating the risk of RF interference with other vehicle systems. In some embodiments, the power a power signal produced on the single-wire antenna has a power density of less than 0.5 milliwatts ("mW") per cubic meter at a distance of 3 centimeters from the single-wire antenna. In other embodiments, a power signal may have a power in the tens of microwatts at the point of production at the power transmitter 130, although in some embodiments the power may be in the hundreds of milliwatts, or between 1 and 10 milliwatts. The power levels for power transmission on the conductor 140 and for data communication on the conductor 140 will ultimately be determined by the application, including such factors as the physical environment in which the conductor is disposed, and the electromagnetic environment in which the conductor is disposed, to name but a few examples. Generally, the power level transmitted by the conductor 140 (for data signals and for power signals) is high enough to provide the desired data and power communications with the load 300, yet low enough to avoid or mitigate interference with other devices in the environment, and/or to avoid communicating data to other devices within or external to the environment within which the conductor 140 and load 300 are disposed. For example, in a motor vehicle environment, the power level of a data transmission signal and power transmission signal are high enough to provide faithful data transmission from the conductor 140 to the load 300, and to provide sufficient power transmission from the conductor 140 to the load 300, without causing interference with other systems within the motor vehicle, and without transmitting data to nearby vehicles.

The proximity of the conductor 140 to the load 300 in such embodiments may provide several benefits, especially as compared to traditional systems in which sensors and other devices are connected to an ECU through a wiring harnesses, or systems that communicate wirelessly from a greater distance, such as would be the case for example with an automobile's ECU, which cannot be near each of several distally distributed sensors.

For example, if the conductor 140 is within 2 or 3 centimeters of the load 300, the signal power required to transmit a signal from the conductor to the load, or from the load to the conductor, may be limited, such that data may be faithfully communicated across that distance, or in some embodiments two or three times that distance, but small enough to avoid interfering with other systems in the vehicle, or nearby vehicles. In addition, in some embodiments, security of the system may be enhanced if the signal power is limited to an amount such that the signals are too weak to be received outside the vehicle.

Figure 4:
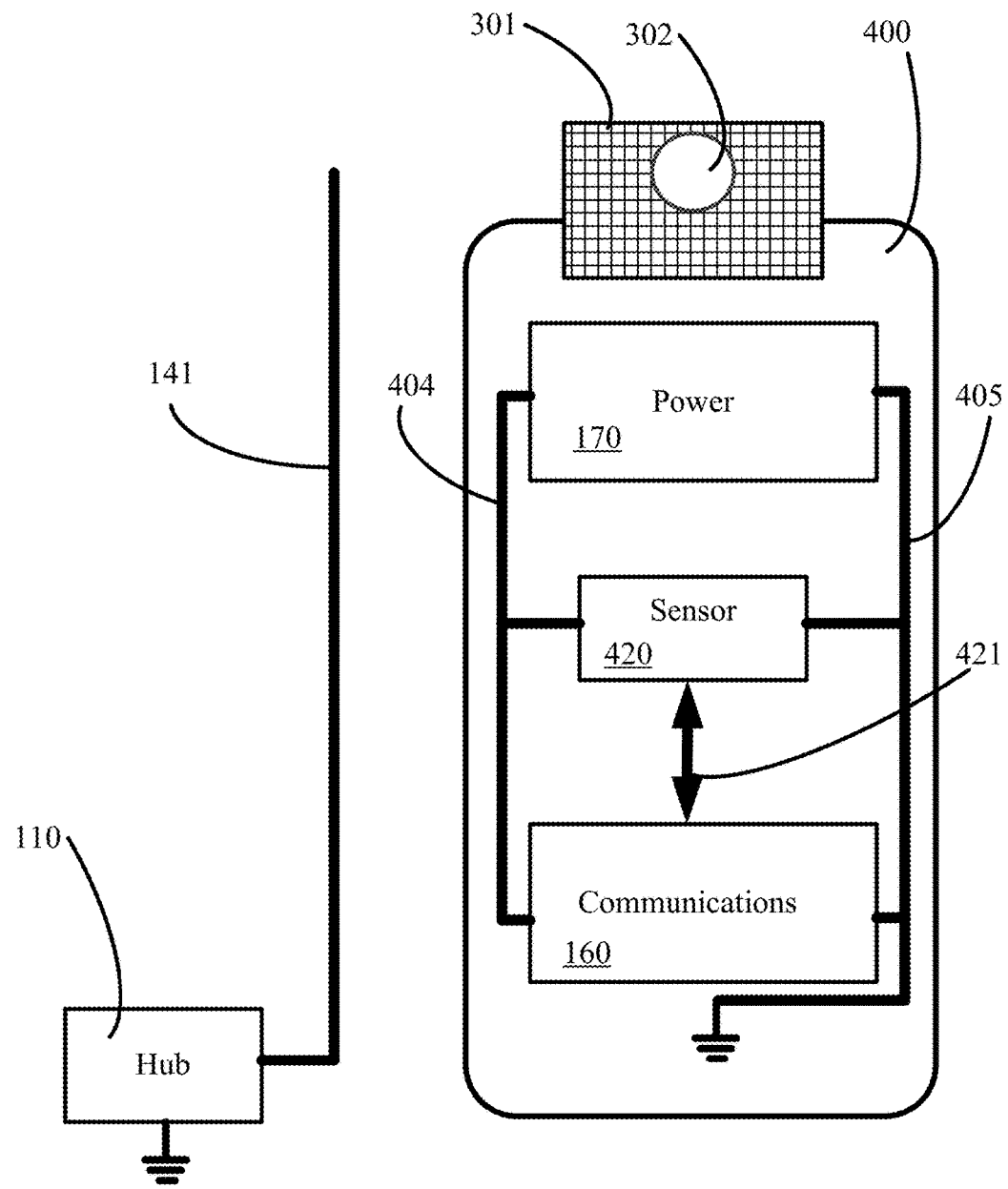
FIG. 4 schematically illustrates an embodiment of a sealed sensor.

FIG. 4 schematically illustrates internal components of a sealed sensor module 400, which is a type of load 150. A sealed load, such as sealed sensor module 400 for example, is an apparatus that is environmentally sealed.

The sealed sensor module 400 includes a data communications interface 160 configured to send, or receive, or send and receive, wireless (e.g., magnetic; electromagnetic) data signals. The wireless data communications interface is 160 separate from, and in addition to, the wireless power interface 170.

Sealed sensor module 400 also includes a sensor 420. Generally, a sensor is a device configured to measure or detect environmental conditions external to the sensor, such as acceleration or rotation, for example. A sensor may be, without limitation, an inertial sensor such as an accelerometer or gyroscope, to name but a few examples. The sensor provides output data to the communications module 160 via load data bus 421, so that the communications module 160 can transmit that sensor output data back to the hub 110, for example. In some embodiments, the communications module 160 may also communicate data to the sensors 420 via the load data bus 421, for example to control the sensor 420 to cause the sensor 420 to, for example, power on; power off; enter a low-power consumption state; awaken from a low-power consumption state; initiate self-test; send self-test results data; send sensor output data; reset sensor output data.

In addition, the sealed sensor module 400 includes a power reception module 170 to receive, and optionally to store, power received wirelessly from conductor 140. The sensor module 400 distributes power from the power module 170 to the communications module 160 and to the sensor 420 via power bus 404. The power module 170 establishes a ground reference for the sensor module 400, and the communications module 160 and to the sensor 420 are coupled to power module 170 via ground reference conductor 405.

A data signal (e.g., magnetic; electromagnetic) is a data signal comprising dynamic data, such as sensor response information or communications protocols for example. A magnetic or electromagnetic data signal may be a signal including dynamic data that is modulated onto a carrier at a frequency sufficient for wireless transmission (e.g., radio frequency, etc.). Consequently, data communication includes the communication of dynamic data, for example data representing sensor response.

FIG. 4 also schematically illustrates an un-terminated single-wire bidirectional power antenna 141, although the sealed sensor module 400 (and indeed any load 150) may receive data and power communications from other types of bidirectional power antenna. Thus, in some embodiments, the wire 140 (e.g., from a hub) is un-terminated and treated as an RF transmit and receive antenna. The hub transmits a pulse or burst of RF to a load (e.g., sensor module 400). Beneficially, in some embodiments, a high frequency (e.g., RF) burst spreads the transmitted power over a wide frequency range to minimize the disturbance to other devices, for example other devices in a vehicle.

Figure 5:
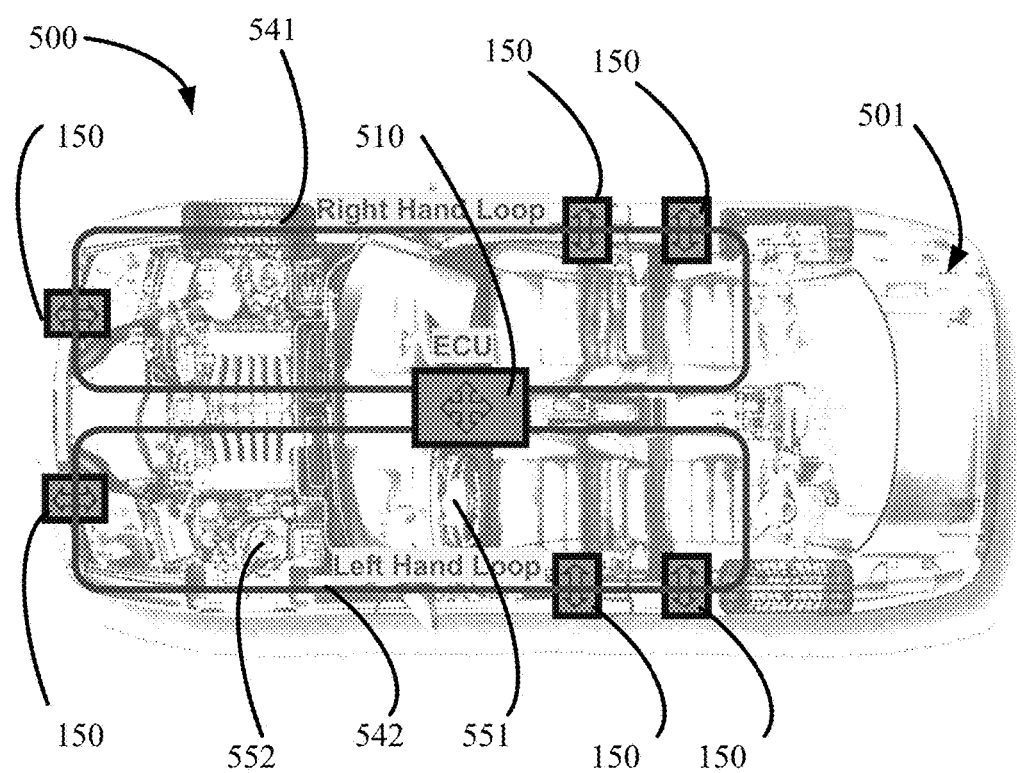
FIG. 5 schematically illustrates a sensor network according to a another embodiment.

Some embodiments transmit power to a sealed sensor, or many sensors in a network, via magnetic power coupling, while other embodiments transmit power to a sealed sensor via an RF signal. Some embodiments are schematically illustrated in FIG. 5, which includes an electronics control unit 510 (or "ECU," which may be an embodiment of a hub) and a single-wire bidirectional power antenna 541 (which in some embodiments may be a looped antenna), and at least one sealed sensor 150 in a motor vehicle 501. Some embodiments may have more than one bidirectional power antenna (e.g., bidirectional power antenna 542), each of which may be a single-wire, such as second (optionally looped) single-wire bidirectional power antenna 541, or an unterminated conductor 141, to name a few examples. In such embodiments, one bidirectional power antenna may be engaged in transmitting power to one or more loads 150, while another is simultaneously engaged in data communications with the one or more loads 150.

The embodiment schematically illustrated in FIG. 5 includes an automotive sensor network system 500 within a motor vehicle 501, in which several sensors (loads 150, some or all of which may be sealed sensors) are in data communication and power communication with electronics control unit (ECU) 510. The ECU may also be in communication with, and may control, one or more safety systems within the motor vehicle, for example in response to data from a load 150) such as air bag 551 or stability control system 552 to name but a few examples.

In this embodiment, the single-wire bidirectional power antenna 541 is a looped single-wire bidirectional power antenna, although other embodiments of automotive sensor network systems may use a non-terminated single-wire bidirectional power antenna, such as antenna 141 for example, in place of or in addition to looped antenna 541. A single-wire bidirectional power antenna that is electrically coupled to an ECU at both ends may be referred-to as a "double-terminated" antenna.

The looped single-wire bidirectional power antenna may be a wire disposed within motor vehicle 501 to run from the ECU 510 throughout the motor vehicle 501 so that the looped single-wire bidirectional power antenna 541 runs proximate to each load 150 to which the antenna 541 is to provide power and communication, and then back to the ECU 510, such that the wire forms a loop. For example, antenna 541 may run close enough to each load so that the load is within range of the antenna 541 for purposes of receiving both power communication and data communication. In some embodiments, the antenna 541 may be within 1 or 2 or 3 centimeters of a load 150, for example.

In operation the power transmitter 130 in the ECU may transmit power by, for example, generating current pulses (or bursts) onto the loop 541. In some embodiments, the current pulses provide magnetically coupled power and optionally synchronization (or "sync") clock to loads 150. In addition, in some embodiments, the loads 150 respond using time division multiplexing (TDM) using NFC (Near Field Communications) type communications coupled to the ECU wire loop 541, to transmit data (e.g., dynamic data from a sensor 420) to another load 150 or to the ECU 510.

Figure 6:
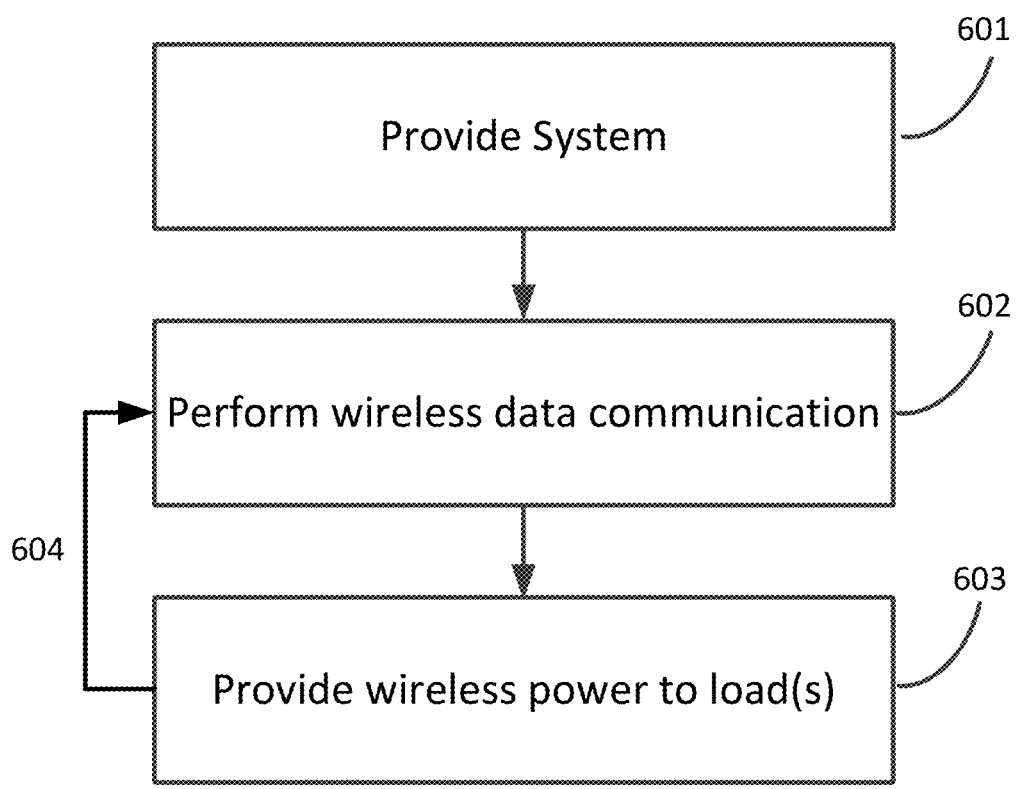
FIG. 6 schematically illustrates a method of operating a network.

A method of operating a network, such as network 100 or the system 500 of FIG. 5 for example, is illustrated by the flow chart of FIG. 6, and begins by providing a system, such as network 100 or system 500 for example at step 610.

A data communications interface engages in wireless data communications by transmitting, and/or receiving, data from one or more loads (150) by a conductor 140, at step 602. In various embodiments, wireless data combinations may be unidirectional (e.g., from a hub 110 to a load 150, or from a load 150 to a hub 110) or may be bidirectional (e.g., in either or both directions between a hub 110 and load 150). In various embodiments, wireless data communications may be implemented in a variety of ways, including without limitation by electromagnetic data transmission or magnetic data transmission. Data communications signals may be transmitted in any of a variety of modulation techniques (e.g., amplitude modulation; frequency modulation; phase modulation) and/or communications protocols.

A power transmitter 130 transmits power on the same conductor 140 to the one or more loads (150), at step 603. The transmission of power may be implemented in a variety of ways, including without limitation, via current pulse or bursts on the conductor 140, or via an electromagnetic signal on the conductor 140.

In some embodiments, the power transmission by power transmitter 130 is performed so as to avoid interfering with other systems, such as other systems within an automobile 501 for example. To this end, one or more characteristics of the transmitted power (e.g., frequencies with a burst 181A; and/or the rate at which bursts (181A; 181B) are transmitted (e.g., the time between bursts); and/or the power level or amplitude of power signals may controlled. For example, the amount of power transmitted by power transmitter 130, or the frequency of such power transmission, may be such that the useful range of the signal is limited to a few centimeters, or in various embodiments, within the volume of an automobile or other motor vehicle. In such embodiments, power would not deliver power to, for example, nearby vehicles on a road, for example.

Figure 1B:
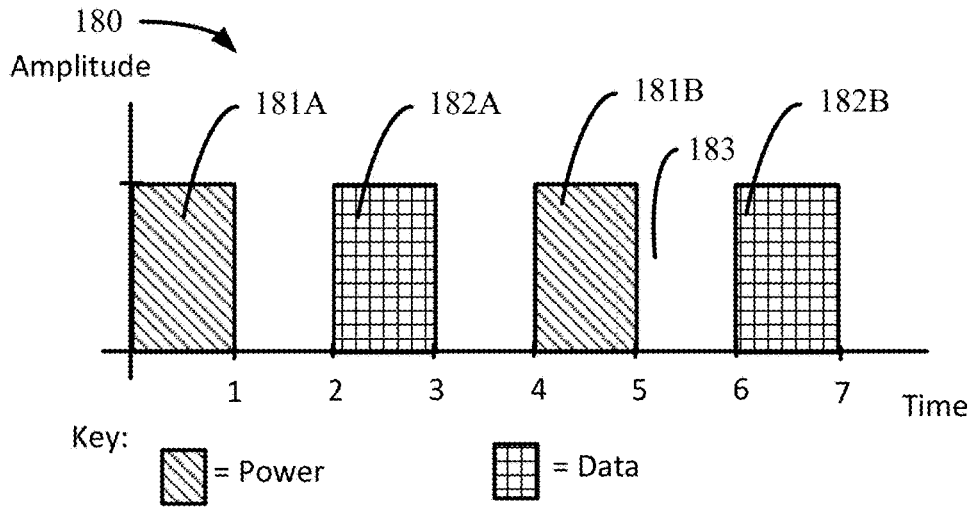
FIG. 1B schematically illustrates intermeshed data signals and power signals.
Figure 1C:
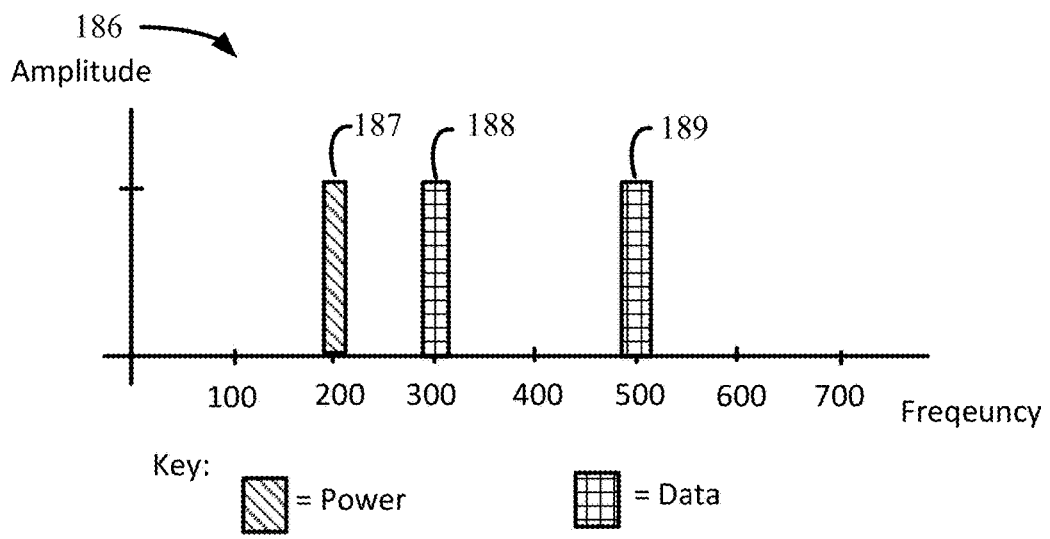
FIG. 1C schematically illustrates a power signal and data signal spectrum.
Figure 1D:
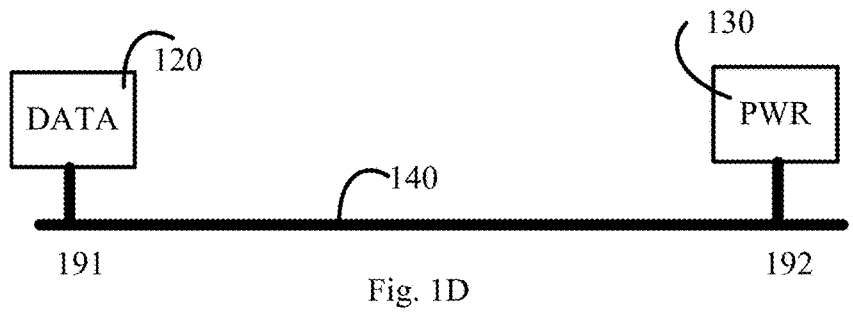
FIG. 1D schematically illustrates a data communications interface and a power transmitter coupled to a conductor at different locations.

The data communication of step 602 and the power communication of step 603 maybe performed in a time-intermeshed way (e.g., as schematically illustrated in FIG. 1B described above), in which case the method 600 may loop from wireless data communication (step 602) to wireless power communication (step 603) and back (step 604) to wireless data communication (step 602). In embodiments that provide data and power communication at different frequencies (e.g., as schematically illustrated in FIG. 1C described above), steps 602 and 603 may occur simultaneously, and one or both of data communication and power communication may occur continuously in time.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes the following:

P1. A network system including a single-wire bidirectional power antenna having a node end and a distal end; a hub coupled to the node end of the single-wire bidirectional power antenna to define an antenna node, the hub including: a communications interface electrically coupled to the single-wire bidirectional power antenna at the antenna node, and configured to send and receive electromagnetic data signals via the single-wire power antenna, and a power source electrically coupled to the single-wire bidirectional power antenna at the antenna node, and configured to produce a power signal on the single-wire power antenna, the hub configured to intermesh the electromagnetic data signals and the power signal on the single-wire bidirectional power antenna.

The embodiments of the invention described above are intended to be merely exemplary; numerous variations and modifications will be apparent to those skilled in the art. All such variations and modifications are intended to be within the scope of the present invention as defined in any appended claims.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed (to be non-transient) either on a tangible medium, such as a non-transient computer readable medium (e.g., a diskette, CD-ROM, ROM, flash drive, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

What is claimed is:

1. A network system disposed within a motor vehicle and comprising:
a single-wire antenna configured to send a power signal, and to send and receive data signals;
a communications interface electrically coupled to the single-wire antenna at a first location along the single-wire antenna, the communications interface configured to send and receive the data signals via the single-wire antenna, but configured not to transmit the power signal;
a power transmitter electrically coupled to the single-wire antenna at a second location along the single-wire antenna different than the first location, the power transmitter configured to produce the power signal but not the data signals on the single-wire antenna; and
at least one sealed sensor module having a clip holding the single-wire antenna, wherein the at least one sealed sensor module is configured to:
wirelessly receive power from the power transmitter, and
wirelessly communicate data with the communications interface, via the single-wire antenna.

2. The network system of claim 1, further comprising:
a plurality of distinct sealed sensor modules, each of the plurality of sealed sensor modules disposed within 3 centimeters of the single-wire antenna, each of the plurality of distinct sealed sensor modules configured to:
wirelessly receive power from the power transmitter; and
wirelessly communicate data with the communications interface, via the single-wire antenna.

3. The network system of claim 1, wherein the power transmitter is configured to transmit bursts of radio frequency energy.

4. The network system of claim 1, wherein the power transmitter is configured to intermittently transmit power signals so as to provide continuous power to the at least one sealed sensor module.

5. The network system of claim 1, wherein the single-wire antenna is a double-terminated antenna.

6. The network system of claim 1, wherein the at least one sealed sensor module comprises a power storage element.

7. The network system of claim 1, wherein the at least one sealed sensor module comprises a gyroscope.

8. The network system of claim 1, wherein the at least one sealed sensor module comprises an accelerometer.

9. The network system of claim 1, wherein the network system is disposed in the motor vehicle having at least one safety system, and at least the communications interface is part of an electronics control unit that controls the at least one safety system.

10. The network system of claim 1, wherein:
the single-wire antenna has an unterminated end distal from the power transmitter; and wherein:
the power signal comprises an RF signal.

11. The network system of claim 1, wherein:
the power signal produced on the single-wire antenna has a power density below 0.5 microwatts per cubic meter at a distance of 3 centimeters from the single-wire antenna.

12. A motor vehicle sensor system comprising:
a motor vehicle;
a dual-mode loop antenna within the motor vehicle;
a communications interface electrically coupled to the dual-mode loop antenna at a first location along the dual-mode loop antenna, and configured to send and receive data signals via the dual-mode loop antenna, but configured not to transmit a power signal;
a power transmitter electrically coupled to the dual-mode loop antenna at a second location along the dual-mode loop antenna different than the first location, and configured to produce the power signal but not the data signals on the dual-mode loop antenna; and
at least one sensor module disposed less than 3 centimeters from the dual-mode loop antenna, the at least one sensor module:
in wireless power communication with the power transmitter, via the dual-mode loop antenna, and
in wireless data communication with the communications interface, via the dual-mode loop antenna.

13. The motor vehicle sensor system of claim 12, wherein the at least one sensor module is a sealed sensor module comprising an accelerometer.

14. The motor vehicle sensor system of claim 12, wherein the at least one sensor module is a sealed sensor module comprising a gyroscope.

15. The motor vehicle sensor system of claim 12, wherein the at least one sensor module is a battery-less sensor module.

16. The motor vehicle sensor system of claim 12, wherein the motor vehicle further comprises at least one safety system under control of an electronics control unit wherein at least the communications interface is part of the electronics control unit.

* * * * *